United States Patent

Spangler

[15] 3,678,466

[45] July 18, 1972

[54] ELECTRONIC CALCULATOR

[72] Inventor: Richard M. Spangler, Loveland, Colo.

[73] Assignee: Hewlett-Packard Company, Palo Alto, Calif.

[22] Filed: Oct. 14, 1970

[21] Appl. No.: 80,533

[52] U.S. Cl. .......... 340/172.5
[51] Int. Cl. .......... G09f 9/00
[58] Field of Search .......... 340/172.5, 324 A

[56] References Cited

UNITED STATES PATENTS

| | | | |
|---|---|---|---|
| 3,328,763 | 6/1967 | Rathbun et al. | 340/172.5 |
| 3,364,473 | 1/1968 | Reitz et al. | 340/172.5 |
| 3,372,381 | 3/1968 | Raspanti | 340/172.5 |
| 3,428,793 | 2/1969 | Scuitto | 340/172.5 X |
| 3,544,971 | 12/1970 | Looschen | 340/172.5 |
| 3,555,520 | 1/1971 | Helbig et al. | 340/172.5 |
| 3,581,290 | 5/1971 | Sugarman | 340/172.5 |
| 3,248,528 | 4/1966 | Campeau | 340/172.5 |

*Primary Examiner*—Paul J. Henon
*Assistant Examiner*—Paul R. Woods
*Attorney*—Roland I. Griffin

[57] ABSTRACT

A programmable electronic calculator having a display register for storing numerical information is provided with an additional register which always contains the current instruction code and program statement number. A control on the keyboard permits the display of either register without disturbing the contents of either register.

2 Claims, 1 Drawing Figure

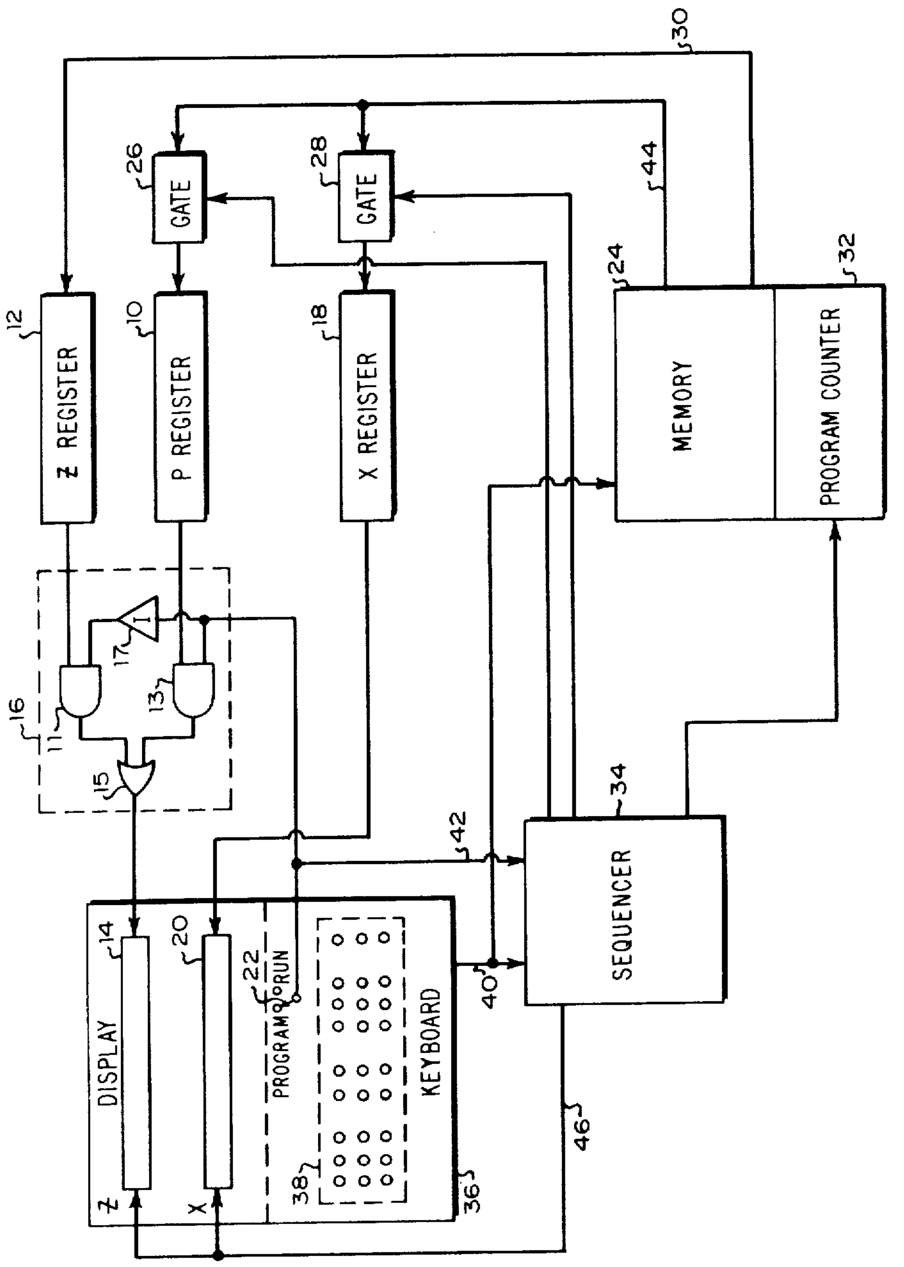
INVENTOR
RICHARD M. SPANGLER

ELECTRONIC CALCULATOR

BACKGROUND AND SUMMARY OF THE INVENTION

In programmable electronic calculators constructed according to the prior art, it was usually necessary to enter programming information into a display register, displacing numerical information, to display the operation or instruction code and corresponding statement number to the programmer or operator. Often the statement displayed was the one just executed, which means that the programmer had to perform several additional operations before that statement could be changed. The present invention provides an additional register for the storage of program information which can be displayed by changing a switch and without changing or displacing any numerical information in the display register. In addition, the program information displayed represents the next statement to be executed, enabling the programmer to see the statement he is changing before it is executed. Provision is also made to display the statement just executed in an additional display register for the convenience of the programmer.

DESCRIPTION OF THE DRAWING

The drawing shows a block diagram of an electronic calculator embodying the present invention.

DESCRIPTION OF THE PREFERRED EMBODIMENT

As shown in the FIGURE, a P register 10 and a Z register 12 are connected to a display 14 through a gating circuit 16, and an X register 18 is connected to a display 20. Gating circuit 16 is controlled by PROGRAM/RUN switch 22 and is comprised of AND gates 11 and 13 connected to OR gate 15 which in turn is connected to display 14. When switch 22 is in the RUN position the signal from switch 22, inverted by an inverter 17, opens AND gate 11 and causes the contents of Z register 12 to be displayed. When switch 22 is the PROGRAM position the signal from switch 22 opens AND gate 13 and the contents of P register 10 are displayed. Registers 10 and 18 are connected to a memory 24 through gates 26 and 28, respectively. This memory may be, a magnetic core memory such as those described in chapter 13 of *Computer Logic* by Ivan Flores, 1960, particularly those in sections 13.4 through 13.7 of that chapter. Z register 12 is connected to memory 24 through a line 30. A program counter 32 connected to memory 24 determines which statement of a program in memory 24 is to be executed at a particular instant. One suitable type of counter is shown in FIG. 11.9.1 and described in section 11.9 of chapter 11 of Flores. The output of each stage of that program counter would be connected to the address register of the memory shown in Flores FIG. 13.6.4. Sequencer 34, connected to displays 14 and 20, switch 22, gates 26 and 28, program counter 32, and keyboard 36, is essentially a sequential counter which determines the sequence in which the various parts of the calculator perform their functions. The operation of sequencer 34 is more fully explained below.

All operations of the calculator are initiated by an entry from keyboard 36. When switch 22 is in the RUN position, the calculator is in the run mode, performing various mathematical functions as commanded by the keys 38. When switch 22 is in the PROGRAM position, the calculator is in the program mode in which the key code for key depressed on keyboard 36 is entered sequentially into memory 24, creating a sequence of instruction codes or statements. The calculator will perform the statements stored or programmed in memory when the calculator is returned to the run mode and the appropriate initiating key or keys are depressed.

The programming sequence is controlled by the sequencer 34. As mentioned above sequencer 34 is essentially a sequencial counter and a common type of counter suitable for such use is a ring counter shown in FIG. 11.9.7 of Flores. Since the sequence has four different states, a four stage ring counter would be used, with the output of each stage forming one of the four outputs of the sequencer. A counter needs to be driven by a clock or pulse generator and a suitable pulse-train generator is shown in FIG. 11.10.1 of Flores. Line 40 from the keyboard would supply a keydown signal at the start input of the pulse-train generator through an AND gate that is also connected to line 42. The "N pulses" output of the generator would be connected to the "count" input of the ring counter. With the calculator in the program mode, the contents of X register 18 displayed in display 20 will show the ordinal number and instruction code of the statement just entered which would have been just executed if the calculator were in the run mode. The contents of P register 10 will be displayed in display 14, showing the number and instruction code of the next statement. For the sake of example, assume that memory is cleared, that is, there are zeros at all memory locations, and that the first statement has just been entered. Display 20 will show statement number 01 and an instruction code; display 14, statement number 02 and a zero instruction code. The next key depressed will send a signal on line 40 to sequencer 34. In addition, sequencer 34 receives a signal from switch 22 on line 42 indicating switch 22 is in the PROGRAM position and enabling the sequencer to perform the programming sequence. Line 40 is also connected to memory 24 and the instruction code corresponding to the key depressed will be stored at memory location 02, the current statement number. Flores shows how such information is entered into memory in connection with FIG. 13.6.4. in chapter 13. The current statement number and instruction code are available on line 44 and sequencer 34 will first open gate 28, causing X register 18 to store that information. Next sequencer 34 will close gate 28 and will increment program counter 32 one statement, making the current statement number 03. Sequencer 34 will then open gate 26 causing P register 10 to store the current statement number, 03, and the instruction code, zero for this example. Finally, sequencer 34 will close gate 26 and will send a display signal to display 14 and 20 on line 46. Sequencer 34 will continue to send the display signal until the next key stroke. Z register 12 will remain unchanged during this process.

When switch 22 is put in the RUN position, X register 18 and Z register 12 are used for numerical manipulation or display or numerical information and P register 10 is not displayed.

If during the operation of the calculator the operator wishes to examine the current program statement without disturbing the contents of any register, he need simply move switch 22 to the PROGRAM position and display 14 will display the contents of the P register 10. When switch 22 is returned to the RUN position, Z register 12 is again displayed in display 14 and the operation of the calculator can proceed as if there had been no interruption.

I claim:

1. An electronic calculator comprising:

a keyboard;

memory means for storing a program of statements for the calculator, the memory means including a program counter for determining the program statement to be executed;

a first storage register for storing numerical information;

a second storage register for storing alpha-numerical information indicating the current program statement to be executed;

display means for displaying alpha-numerical data from one of said storage registers;

switching means for connecting one of said storage registers to the display means, the switching means being controllable from the keyboard;

gating means for connecting the second storage register with the memory means; and sequential logic means connected to and for sequentially activating the memory means, gating means and display means in response to a signal from the keyboard.

2. An electronic calculator as in claim 1 including a third storage register connected to the display means and the gating means and employed for storing alpha-numerical information indicating the program statement immediately preceding the current program statement.

* * * * *

UNITED STATES PATENT OFFICE
CERTIFICATE OF CORRECTION

Patent No. 3,678,466 Dated July 18, 1972

Inventor(s) Richard M. Spangler

It is certified that error appears in the above-identified patent and that said Letters Patent are hereby corrected as shown below:

Column 2, line 41, "or numerical information" should read -- of numerical information--.

Signed and sealed this 24th day of October 1972.

(SEAL)
Attest:

EDWARD M.FLETCHER,JR.
Attesting Officer

ROBERT GOTTSCHALK
Commissioner of Patents